United States Patent [19]

Kuroda

[11] Patent Number: 5,145,614
[45] Date of Patent: Sep. 8, 1992

[54] PROCESS FOR PREPARING MAGNET MADE OF RESIN

[75] Inventor: Masaaki Kuroda, Tokyo, Japan

[73] Assignee: Canon Kabushiki Kaisha, Tokyo, Japan

[21] Appl. No.: 655,142

[22] Filed: Feb. 14, 1991

[30] Foreign Application Priority Data

Feb. 14, 1990 [JP] Japan ................... 2-31529
Feb. 14, 1990 [JP] Japan ................... 2-31530
Jan. 29, 1991 [JP] Japan ................... 3-9152

[51] Int. Cl.$^5$ ............................. B29C 45/17
[52] U.S. Cl. .................... 264/24; 148/101; 148/302; 264/DIG. 58
[58] Field of Search ............ 264/24, DIG. 58; 148/101, 302

[56] References Cited

U.S. PATENT DOCUMENTS

| | | | |
|---|---|---|---|
| 4,327,346 | 4/1982 | Tada et al. | 264/328.1 |
| 4,604,042 | 8/1986 | Tanigawa et al. | 264/24 |
| 4,678,616 | 7/1987 | Kawashima | 264/DIG. 58 |
| 4,919,858 | 4/1990 | Newton et al. | 264/DIG. 58 |

FOREIGN PATENT DOCUMENTS 56005045 2/1981 Japan .

Primary Examiner—Jan H. Silbaugh
Assistant Examiner—Brian J. Eastley
Attorney, Agent, or Firm—Fitzpatrick, Cella, Harper & Scinto

[57] ABSTRACT

The process for preparing a multi-polar anisotropic resinous magnet by preparing a multi-polar anisotropic resinous magnet by injecting a liquid reaction curable resin containing a magnetic powder into a mold for molding and applying a magnetic field for multiple-pole orientation thereon; the reaction curable resin is injected into a mold for molding set between a large number of magnetic poles arranged at predetermined intervals including magnetic poles with freely convertible magnetism and back yokes opposed to these magnetic poles; a magnetic flux flows in one direction to the back yokes with the respective magnetic poles being made the same polarity, maintaining the resin under uncured state, to localize and orient the magnetic powder in the resin corresponding to the magnetic flux. The reaction curing of the resin is completed while applying a magnetic field obtained by converting the magnetism of the magnetic poles to the desired multi-polar anisotropy of the resinous magnet, thereby localizing and orienting the magnetic powder within the resin corresponding to the magnetic field.

9 Claims, 11 Drawing Sheets

PROCESS FOR PREPARING MAGNET MADE OF RESIN

BACKGROUND OF THE INVENTION

1. Field of the Invention

This invention relates to a multi-polar anisotropic resinous magnet to be utilized for small, high performance motor, etc. and a process for producing the same.

2. Related Background Art

A resinous magnet having a resin containing magnetic powder molded into a ring shape, etc. and a large number of anisotropic magnetic poles provided at the peripheral surface thereof has been utilized or its utilization investigated in various fields, determining that it can easily used for a part constituted of a magnetic member such as motor, etc. to make motor, etc. compact and lightweight.

Corresponding to the expansion of the application scope of resinous magnet, there have been made various attempts made to obtain high performance resinous magnets having high magnetic energy and sharp magnetic poles.

For example, Japanese Patent Publication No. 56-5045, etc. discloses a process for preparing a multi-polar anisotropic magnet by injection molding a thermoplastic resin containing magnetic powder to a high density of 80% by weight to 90% by weight in a magnetic field for orientation (anisotropy formation) of magnetic powder and imparting magnetism to the molded product.

The magnetic force in the resinous magnet obtained by use of a resinous material containing magnetic powder is determined primarily by the amount and the magnetic strength of the magnetic powder used for forming the magnetic force effective region. The magnetic force effective region is the region where magnetic powder is oriented by the magnetic field treatment having the same magnetic direction as the magnetic circuit formed by imparting magnetism.

Whereas, in the resinous magnet described in the above-mentioned Japanese Patent Publication No. 56-5045, because of high magnetic powder content, magnetic powder will be contained at high concentration also in the portion which will not become the magnetic force effective region as shown by 1'. If the magnetic powder content is high, interference between magnetic powder such as agglomeration mutually between magnetic powder becomes greater, whereby movements will be mutually obstructed and the powder cannot be sufficiently attracted in the pole-oriented magnetic field toward the magnetic force effective area near the magnet surface. This tendency will be further worsened by increase of the number of poles of the magnet, because the pole-oriented magnetic field will be migrated toward the magnet surface. In other words, the magnetic powder contributing nothing to the magnetic strength of the resinous magnet will be contained at a high concentration in the non-magnetic force effective region, and the resinous magnet obtained according to this method still had problems to be solved from the standpoint of effective utilization of magnetic powder.

Particularly, for obtaining a resinous magnet of higher performance, rare earth magnet powder is frequently used as the magnetic powder, but rare earth magnetic powder is very expensive as compared with ferrite magnet powder. Therefore, when these rare earth magnet powders are utilized, effective utilization of magnetic powder in the resinous magnet is important in lowering the cost of a high performance resinous magnet.

Further, if the content of magnetic powder can be reduced by more effectively utilizing magnetic powder, it also becomes possible to make the resinous magnet itself lightweight.

As in the prior art as described above, by incorporating magnetic powder in a thermoplastic resin at a high concentration of 80 to 90% by weight, flowability is considerably worsened and therefore high mold temperature, high resin temperature, high injection pressure, high injection speed will be required in injection molding. For this reason, special constitutions requiring increased cost are required to be added to the mold, the molding machine, whereby the mold and the molding machine will be enlarged, which also causes the production cost to be increased. Further, in a mold comprising a mold material conventionally used, the capacity of the mold for corresponding to high pressure molding is limited, and in many cases, it is difficult to obtain a mold with high durability in molding under high pressure, high temperature.

As described above, as the method for solving the problem that the magnetic powder cannot be utilized effectively because of formation of a portion contributing nothing to the magnetic force although containing magnetic powder at the central portion of the resinous magnet, namely the non-magnetic force effective region, there has been known a process for preparing a resinous magnet by inserting or outserting, for example, a block made of a thermosetting resin, etc. into the non-magnetic force effective region.

Whereas according to such insert or outsert molding method, improvements can be brought about with respect to effective utilization of magnetic powder because a block, etc. is inserted or outserted into the region contributing nothing to the magnetic force of magnet. However, a resin containing still 80 wt. % to 90 wt. % of magnetic powder is injected into the mold, and therefore there remain problems with respect to molding machine, capacity of the mold durability, etc. Further, by insert or outsert molding, the mold becomes increasingly complicated and the number of steps are increased.

On the other hand, Japanese Laid-open Patent Application Nos. 53-2814 and 53-141499 disclose a process for obtaining a high performance multi-polar anisotropic resinous magnet by increasing the magnetic powder content in the magnetic pole portion magnetized by a multi-polar orientation magnetic field higher than other portions.

However, according to the process disclosed in these Applications, although the effect can be expected to be exhibited with respect to effective utilization of magnetic powder in preparation of a resinous magnet with small number of poles of 2 poles or 4 poles (outer diameter $\phi30$), in preparation of a resinous magnet of small diameter with 6 poles or more conventionally used for small high performance stepping rotor, etc., it is factually impossible to expect the effect as mentioned above. This is because, as the pole number is increased from 4 poles, between the adjoining magnet pair becoming the magnetic circuit which is the principle of polar anisotropic orientation, the portion between the magnetic pole gap becoming the string connecting it at the shortest distance where the magnetic field is applied most strongly will be moved toward surface direction of the outside even to the extent that the pole number is increased relative to the central portion of the cavity. For this reason, the lines of magnetic force will be leaked directly between the magnetic poles at the central portion around the cavity as shown by the arrowhead in FIG. 3, whereby the magnetic powder can be attracted only by the very weak leaked flux defined by the permeance between the gaps of the magnetic poles at the central portion, and therefore the magnetic powder cannot be sufficiently converged to the vicinity of the magnetic poles.

SUMMARY OF THE INVENTION

An object of the present invention is to provide a multi-polar anisotropic resinous magnet having a structure in which magnetic powder can be efficiently utilized for generation of magnetic force and a process for preparing the same.

Another object of the present invention is to provide a process for preparing a multi-polar anisotropic resinous magnet which can reduce the content of magnetic powder, compact lightweight accompanied by decreased cost by having a structure capable of effectively utilizing magnetic powder, and a process for preparing the same.

Still another object of the present invention is to provide a process for preparing a high performance multi-polar resinous magnet, which enables compact lightweight and lower costs.

Still another object of the present invention is to provide a process for preparing a high performance multi-polar anisotropic resinous magnet by utilizing a molding machine having no expensive special constitution for molding under high temperature and high pressure.

Still another object of the present invention is to effect improvement of the preparation process which molds a magnet made of a resin comprising:

injecting a molding material containing a magnetic material into a mold, causing a localizing action on the magnetic pole portion of the magnetic material by a first magnetic circuit, orienting the magnetic material localized in the magnetic pathway direction by a second magnetic circuit, curing the molding material by reaction curing after completion of orientation, particularly to effect simplification of the preparation process and the preparation device.

For accomplishing the above objects, permanent magnets are employed for formation of the above-mentioned first magnetic circuit.

The process for preparing the multi-polar anisotropic resinous magnet of the present invention is a process for preparing a multi-polar anisotropic resinous magnet by injecting a liquid reaction curable resin containing magnetic powder into a mold for molding and applying a magnetic field for multi-pole orientation thereon, comprising:

(a) the step of injecting said reaction curable resin into a mold for molding provided between a large number of magnetic poles arranged at predetermined intervals including magnetic poles with freely convertible magnetism and back yokes opposed to these magnetic poles;

(b) the step of permitting a magnetic flux to flow in one direction to the back yokes with the respective magnetic poles being made the same polarity, maintaining the resin under uncured state injected in said magnetic flux, to localize and orient the magnetic powder in said resin corresponding to said magnetic flux; and (c) the step of, after completion of the step (b), completing the reaction curing of the resin while applying a magnetic field obtained by converting the magnetism of said magnetic poles to the desired multi-polar anisotropy of the resinous magnet, thereby to localize and orient the magnetic powder within the resin corresponding to said magnetic field.

As the reaction curable resin to be used in the present invention, compositions containing at least one selected from monomers, oligomers, polymers and a curing agent can be selected. For examples, mixtures of resinous components such as urethane, nylon, acrylio resin, etc. with a curing agent may be included, and those having sufficient curing time (reaction time from mixing of necessary components to curing) in performing the above-mentioned steps (b) and (c) are used.

As the magnetic powder to be incorporated in the resin, various powders, for example, ferrite magnet powders such as Sr ferrite, neodium iron, rare earth magnet powders, etc. can be utilized. According to the process of the present invention, since magnetic powder can be utilized, even when expensive rare earth magnet powder may be employed, elevation of the production cost can be greatly suppressed.

The content of the magnetic powder in the starting resin may be suitably selected depending on the magnetic strength, etc. of the desired resinous magnet, but when flowability of the resin within the mold, movement, orientation of the magnetic powder in the resin during application of magnetic field are considered, it is made 70% by weight or less, preferably 50 to 70% by weight.

In the present invention, by using a reaction curable resin containing, for example, 50 to 70% by weight of magnetic powder, a magnetic force effective area containing magnetic powder at a high concentration of 80 to 95% by weight can be obtained.

BRIEF DESCRIPTION OF THE DRAWINGS

FIG. 1 being the whole constitutional view of the device,

FIG. 2 a view showing the pertinent longitudinal view of the mold,

FIG. 3 a sectional view taken along the A1-A2 direction in FIG. 2,

FIG. 4 a diagram for illustration of the magnetic circuit,

FIG. 5 a diagram for illustration of the action of the back yoke 10,

FIG. 6 a diagram for illustration of localization of the magnetic material of the molded magnet, FIG. 7 a control block diagram for the device shown in FIG. 1, FIG. 8 a diagram for illustration of the effect of the magnet according to preparation of the present invention.

DESCRIPTION OF THE PREFERRED EMBODIMENTS

FIG. 1 through FIG. 6 show a first embodiment of the present invention.

Figure 1:
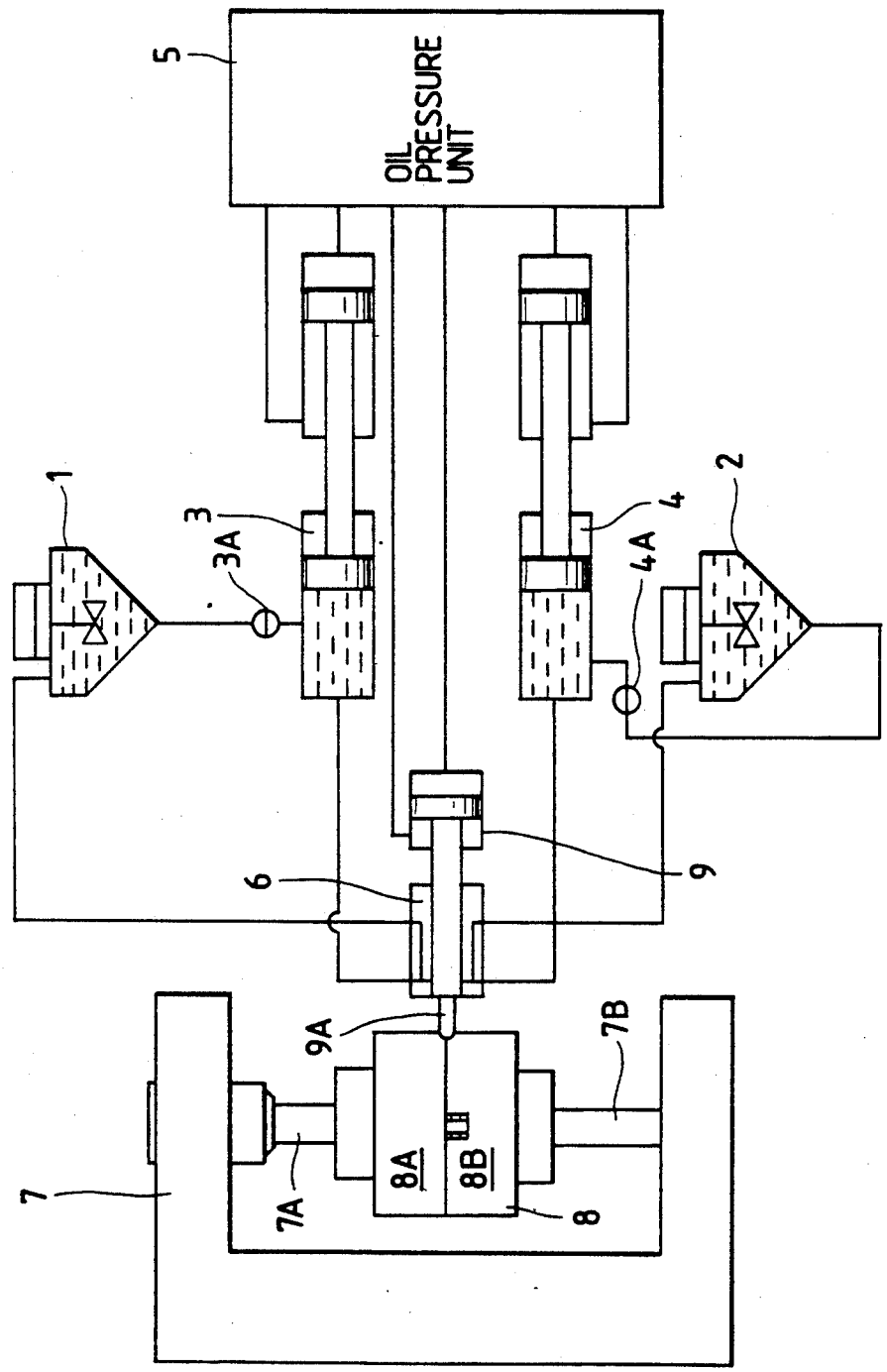
FIG. 1 through FIG. 8 are drawings concerning the first embodiment.
Figure 2:
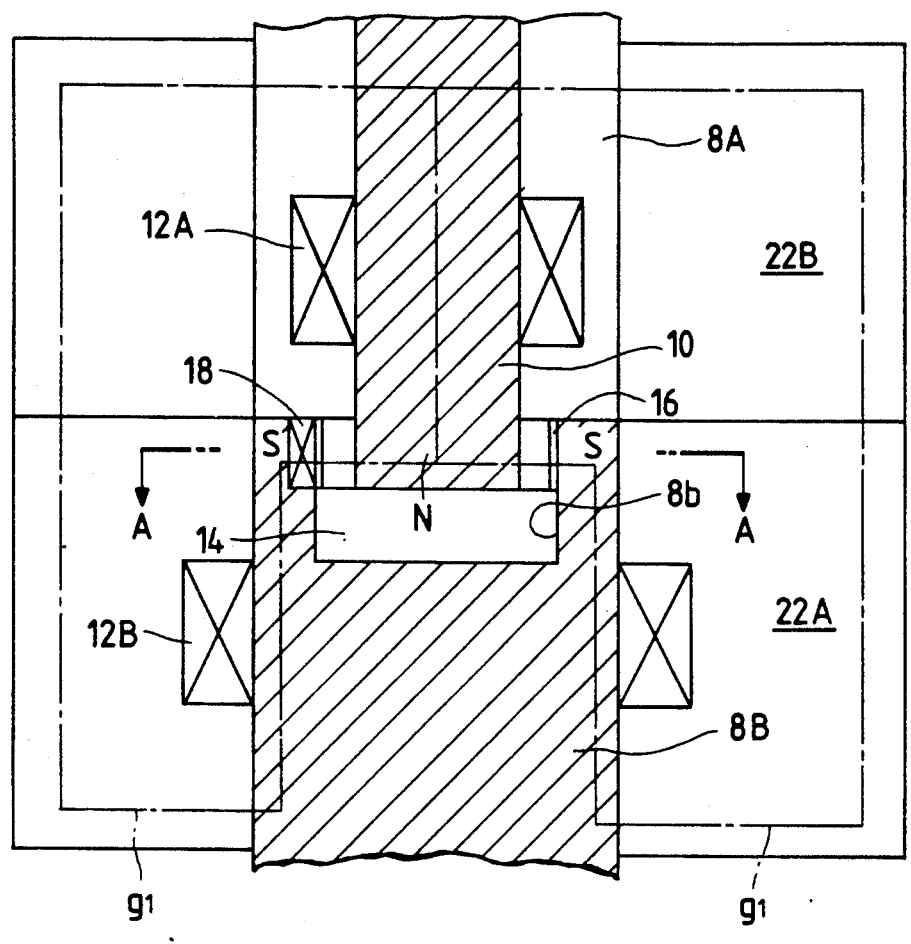

FIG. 1 is a constitutional view of the whole device of the first embodiment, and FIG. 2 a constitutional view of the mold portion, respectively. In FIG. 1, the symbols 1, 2 represent the tanks of the first material and the second material, with the first material being the main resin for molding, and the second material the reaction curable material as described below. Into each of the first and second materials may be mixed a magnetic material, or alternatively into only one of the materials. The symbols 3, 4 are metering cylinders for metering by introducing the respective materials from the above-mentioned tanks 1 and 2. 3A and 4A are flow rate control valves. The respective metering cylinders 3, 4 deliver the first and second materials metered in said metering cylinders to the mixing head 6 for mixing. The mold 8 is described in detail in FIG. 2, and comprises an upper mold 8A and a lower mold 8B, and the upper and lower molds are loaded through the press rods 7A, 7B of the pressing device 7. 9 is an injection cylinder, and injects the materials mixed in the mixing head 6 from the cylinder head 9A through the gate into the cavity of the mold.

The oil pressures of the metering cylinders 3, 4 and the injection cylinder 9 are controlled by the oil pressure unit 5.

Figure 3:
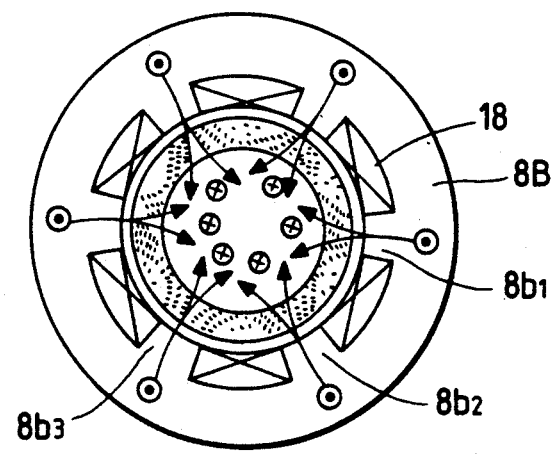

Referring now to FIG. 2, the mold structure is described in detail. The upper mold 8A forms a hollow cylindrical shape and is made of a non-magnetic material such as stainless steel, etc. 10 is a back yoke member made of a magnetic material which is cylindrically shaped and inserted into the hollow portion of the upper mold 8A. 12A is a coil for a first magnetic circuit wound around the back yoke member 10. 12B is a coil for a first magnetic circuit wound around the lower mold 8B for magnetization of the lower mold 8B. The lower mold 8B is cylindrically shaped, with its upper end surface forming a circular concave portion $8b$, and a non-magnetic member 14 constituting the cavity for molding is inserted at the bottom of said concave portion $8b$. At the inner circumferential upper end of the above concave portion $8b$ of the lower mold 8B is fixed a sleeve material comprising a magnetic material constituting the outer circumferential surface of the cavity, and at the above concave portion of the lower mold 8B are formed polar teeth $8b_1$, $8b_2$, ... toward the center direction as shown in FIG. 3. The symbol 18 is the electromagnetic coil wound around the above polar teeth $8b_1$, $8b_2$, ..., and forms a second magnetic circuit as described below.

The cavity 20 for magnet formation is formed of a back yoke member 10, a sleeve 16, a non-magnetic member 14, the lower end surface of the upper mold 8A etc.

DESCRIPTION OF THE OPERATION OF THE DEVICE

Next, the operation of the above-mentioned device is described.

In the device shown in FIG. 1, the respective materials are charged into the tanks 1 and 2, and heated by the heating means not shown, whereby the respective materials are made liquid.

Initially, by passing current through the above-mentioned electromagnetic coils 12A and 12B to excite the back yoke member 10 to N-pole and the lower mold 8B to S-pole to form a first magnetic circuit.

The first magnetic circuit formed by current passage through the coils 12A and 12B is formed of the back yoke member 10-cavity 20-sleeve 16-lower mold 8B and the magnetic channel members 22A and 22B covered over the peripherals of the above-mentioned upper and lower molds as shown by the chain line in FIG. 1. Under the state where the above first magnetic circuit is formed, via the tanks 1 and 2 through the metering cylinders 3 and 4, the molding materials mixed in the mixing head 6 are injected by the injection cylinder 9 through the gate not shown into the above-mentioned cavity 20.

The molds 8A, 8B are provided with a heater and a thermocouple for controlling the temperature within the cavity 20, and the material to be molded injected into the cavity is maintained under fluidized state. The magnetic material in the molding material injected into the cavity moves to the vicinity of the respective magnetic pole portions of the lower mold 8B by the influence of the magnetic force of the first magnetic circuit, and, as shown in FIG. 3, is localized with formation of a partial mass state of the magnetic material in the molding resin material within the cavity.

More specifically, within the molding material, the magnetic material is gathered at a high density within the magnetic force effective region corresponding to the magnetic pole portion of the molding magnet, and the density of the magnetic material becomes lower at magnetic pole portions and the magnetic force non-effective region between the magnetic pole portions.

After a sufficient lapse of time for localization of the magnetic material by injection of the molding material during formation of the first magnetic circuit by current passage through the coils 12A and 12B as described above, current passage through the coils 12A and 12B is stopped and current passage through the coil 18 is initiated.

Figure 4:
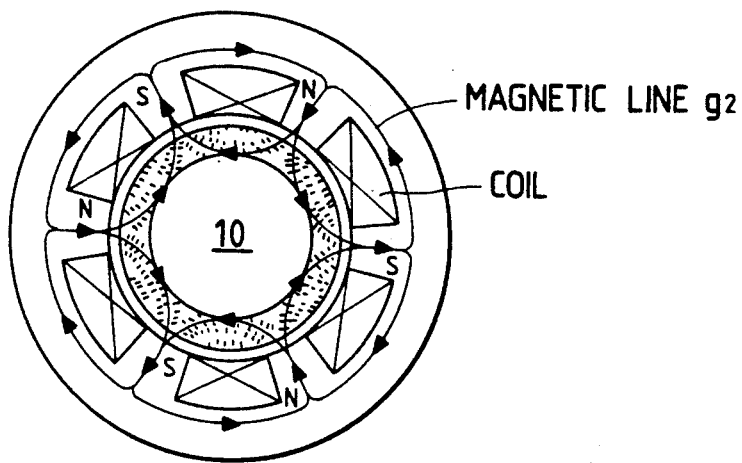

By current passage through the coil 18, N-pole and S-pole are excited at the pole teeth of the lower mold 8B as shown in FIG. 4 to form a plurality of second magnetic circuits with the sleeve 16, the molding material and the lower mold 8B. The magnetic material in the molding material is oriented by the second magnetic circuits along the lines of magnetic force shown in FIG. 4.

In the case, due to the presence of the back yoke 10 constituted of a high permeability magnetic material, the lines of magnetic force $g_2$ flowing from the magnetic poles into the cavity 20 are attracted toward the back yoke 10, whereby the lines of magnetic force $g_2$ can be delivered to deeper place in the inner circumferential wall direction of the cavity than the lines of magnetic force $g_3$ when no back yoke is provided, and also leak 26 between the magnetic poles can be effectively prevented.

Figure 6:
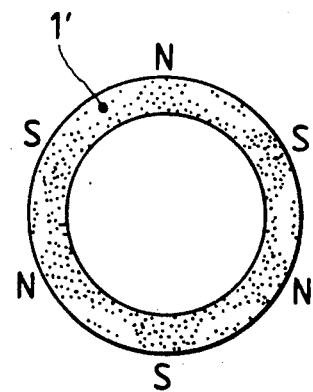

When the desired magnetic powder is localized, the orientation state fixed and the shape of the molded product cured and stabilized, the molded product can be taken out from within the mold to obtain a ring shaped multi-polar anisotropic resinous magnet as shown in FIG. 6.

The resinous magnet contains magnetic powder at a high concentration in the magnetic force effective area and also at a low concentration in the non-magnetic effective area, thus having an extremely high utilization efficiency of magnetic powder.

Since the cured state can be made optimum according to the combination of the resin and the curing agent, the mixing ratio thereof, the heating state of the mold, differing from a thermoplastic resin which begins to be solidified by cooling simultaneously with injection into the mold, a sufficiently localized, oriented state of magnetic powder can be obtained until solidification.

The magnetic field may be applied until at least the desired localized, oriented state of the magnetic powder in the resin within the cavity is stabilized and also the desired magnetic force is obtained.

The magnetic forces of the respective magnetic poles may be determined corresponding to the design of the desired product, and may be made either identical or different.

Figure 7:
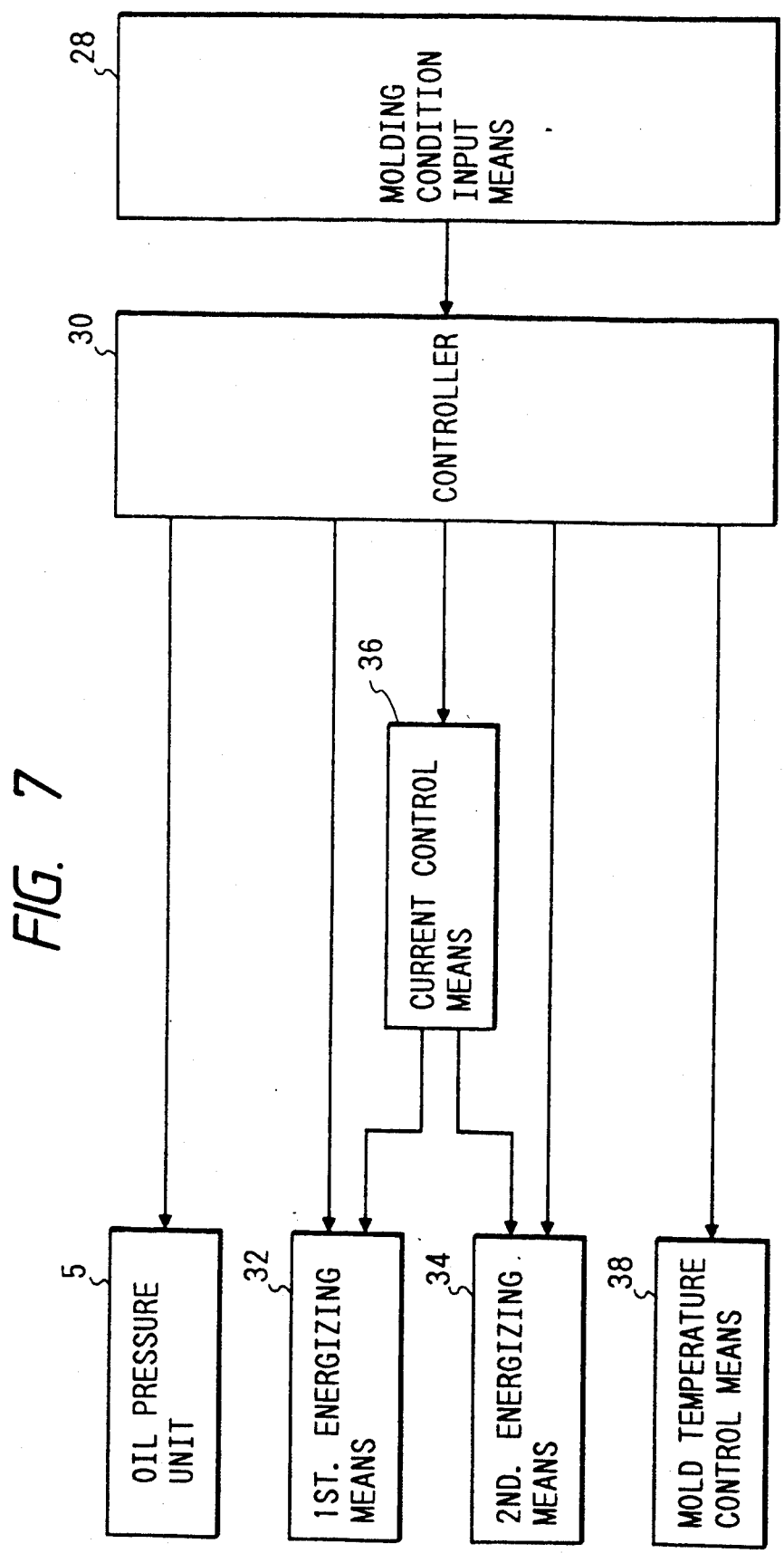

FIG. 7 shows a block diagram for controlling the device in FIG. 1 and the mold in FIG. 2.

In the Figure, the molding condition input means 28 inputs various conditions of the magnet made of a resin to be molded and controls the controller by the respective conditions.

The above-mentioned conditions include the following:

(i) Design conditions of magnet

Diameter, inner diameter, thickness dimension, height of magnet;
Number of magnetic poles of magnet;
Torque of motor for which magnetic is used, magnitude of magnetic force of magnetic pole, (ii) Conditions of molding materials Choice of the materials used according to the design conditions of magnet as mentioned above, namely the resin material as the main molding agent, the material of the reaction curing agent, the magnetic material, etc. determined according to the flow temperatures of the respective materials, the reaction curing temperature, the magnetic force of the magnetic material, and the conditions of flow temperature of the molding resin material and the localization efficiency of the magnetic material, and further the condition of the mixing ratio of the resin material, the reaction curing material and the magnetic material;

(iii) Control conditions of the oil pressure unit 5

As the control conditions of the oil pressure unit 5, the driving conditions (driving timing, driving force, driving time, etc.) of the metering cylinders 3, 4 and the injection cylinder 9 based on the amounts of the respective materials fed from the tanks 1, 2;

(iv) Control conditions of mold

As the control conditions of the mold, the temperature of the heater embedded in the mold, the timing of ON, OFF, etc. are controlled by the signal of the thermocouple of the temperature sensor corresponding to the design conditions of the magnet, the conditions of the materials as described above. Further, the amount of current passed to the electromagnetic coils 12A, 12B and the current passage time are controlled according to the current control means 36, the first current passage means 32 by the signals from the controller 30.

The amount of current passed to the electromagnetic coil 18 for forming the second magnetic circuit as mentioned above and the current passage time are controlled according to the current control means 36 and the second current passage means 34 by the signals from the controller 30.

EXAMPLE 1

A reaction curable epoxy resin (curing time 1 min.) containing 67% by weight of samarium cobalt ($SmCo_5$) powder (particle size about 1 to 3 $\mu$m) was prepared, injected and filled into the cavity 20 of a mold having a constitution as shown in FIG. 1 under the state where current is passed to the electromagnetic coils 12A, 12B, which state was maintained for 3 seconds.

The cavity is constituted so that a ring-shaped molded product with an outer diameter of 6 mm, an inner diameter of 4 mm and a height of 7 mm can be formed, and the magnetic force strength of the back yoke 10 was 20 KG on the cavity surface. The timing of magnetic excitation may be either during injection or during injection filling.

Next, magnetic excitation by the electromagnetic coils 12A, 12B were stopped, current was passed through the electromagnetic coil 18 to excite the pole teeth to make the adjoining pole teeth to have different polarities, which state was maintained for 1 minute.

For obtaining the present molded product, a main agent containing magnetic powder (first liquid) and a curing agent (second liquid) were charged into the feed tanks of the device shown in FIG. 1, and maintained at about 40° C. under circulation. The first liquid is a mixture of caprolactam and a polyesteramide prepolymer, and the second liquid a mixture of caprolactam and Grignard reagent. Next, said first and second liquids were mixed and injected through the mixing nozzle into a mold of 90° C., maintained for about one minute and then the mold was opened, followed by mold release by an ejection pin. For making the mold release resistance smaller, no magnetic excitation by electromagnetic coil was effected during mold opening.

The formation state of the magnetic pole at the surface perpendicular to the axis of the resinous magnet of the ring-shaped resinous magnet, and the localized, oriented states were examined by lapping the section of the magnet and observing the section by a metal microscope, and the content of the magnetic powder by extracting and calcining a small strip from the magnet. As the result, as shown in FIG. 6, 6 anisotropic magnetic poles were formed at the peripheral sides, and it was also confirmed that most of the magnetic powder was localized and oriented within the magnetic force effective area 1 along the lines of magnetic force passing through the respective magnetic poles. The content of the magnetic powder in the magnetic force effective area was found to be 92% by weight, and that in the non-magnetic force effective area 8% by weight.

Further, a ring-shaped resinous magnet obtained according to the magnetism imparting method known in the art was imparted with magnetism, and its surface flux density and weight were measured. As the result, the surface flux density was found to be 730 G, and the weight 0.3 g.

COMPARATIVE EXAMPLE

A thermoplastic 6-nylon resin containing 93% by weight of samarium cobalt powder (particle size: about 1 to 3 μm) was injection molded according to the 6-pole anisotropic orientation method known in the art under the conditions of a resin temperature of 280° C., an injection pressure of 1500 Kg/cm$^2$, a mold temperature of 110° C.

The ring-shaped resinous magnet after imparting of magnetism was found to have a surface flux density of 720 G and a weight of 0.6 g.

When the formation state of the magnetic poles at the surface perpendicular to the axis of the ring-shaped resinous magnet was examined, it was confirmed that 6 anisotropic magnetic poles were formed at the peripheral sides thereof. When the distribution state of the magnetic powder at the surface perpendicular to the axis was examined, the magnetic powder content in the magnetic force effective region was found to be 86% by weight, and the magnetic powder content at the portion contributing nothing to the magnetic force corresponding to the non-magnetic force effective region 1' in FIG. 6 was as high as 94% by weight.

As can be understood from the results as described above, the multi-polar anisotropic resinous magnet according to the present invention is greater in surface flux density and also lighter in its own weight, and therefore very useful for high rotation torque rotor, etc.

Particularly as one of the items for obtaining good rotation performances for rotor, low moment of inertia may be mentioned. The moment of inertia of rotor is proportional to the square of the distance in the radius direction from the center of rotor and the specific gravity of its point. Therefore, when the ring-shaped resinous magnet having the constitution shown in FIG. 6 is used as rotor, because the magnetic powder content in the non-magnetic force effective region 1' formed on the outer peripheral wall side of rotor is low, namely small in specific gravity, the moment of inertia can be made lower to give good rotation performance to rotor.

According to the present invention, since magnetic powder ca be localized effectively in the magnetic force effective region, magnetic powder can be utilized efficiently for magnetic force. As the result, a magnetic force effective region containing magnetic powder at a high concentration even with a small amount of magnetic powder contained can be obtained, whereby sufficient magnetic strength can be obtained, and also it becomes possible to effect lower cost and lightweight.

In the present invention, the resinous magnet is obtained by low pressure molding, and therefore no constitution required for high pressure molding is unnecessary for molding machine, thus enabling utilization of inexpensive molding machine, and reduction of production can also be effected from this point.

According to the present invention, no insert or outinsert such as a block made of a thermoplastic resin, etc. is required, and therefore it is possible to prepare efficiently a multi-polar anisotropic resinous magnet by integrated molding with energy saving.

Figure 8:
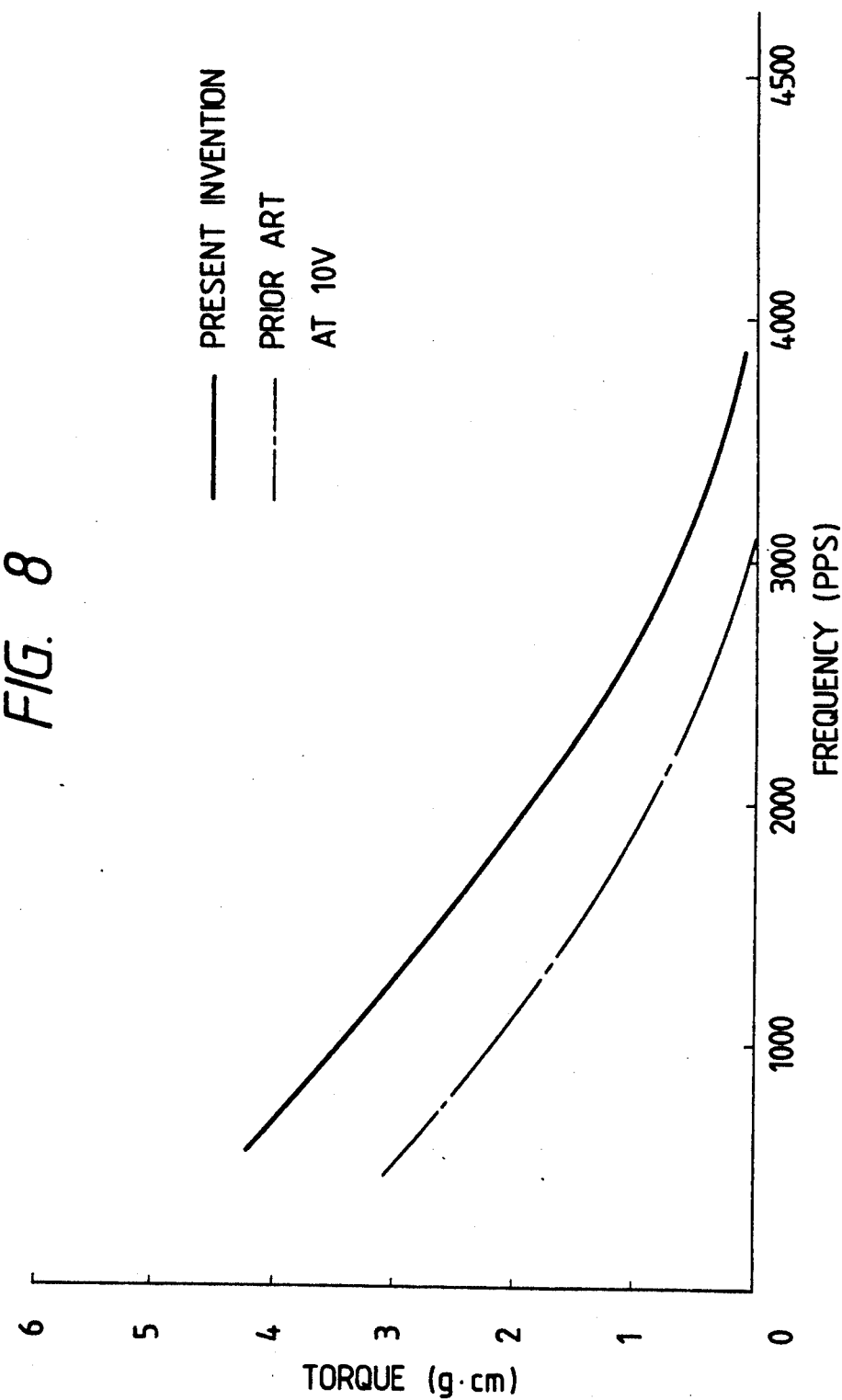

FIG. 8 is a graph showing the comparison results between the magnet $M_1$ prepared by the above Example of the present invention and the magnet of the above Comparative example.

The axis of abscissa indicates magnetized frequency, and the axis of ordinate axis torque g-cm.

Referring now to FIG. 9 to FIG. 17, the embodiments of other objects according to the present invention as mentioned above are described.

Figure 9:
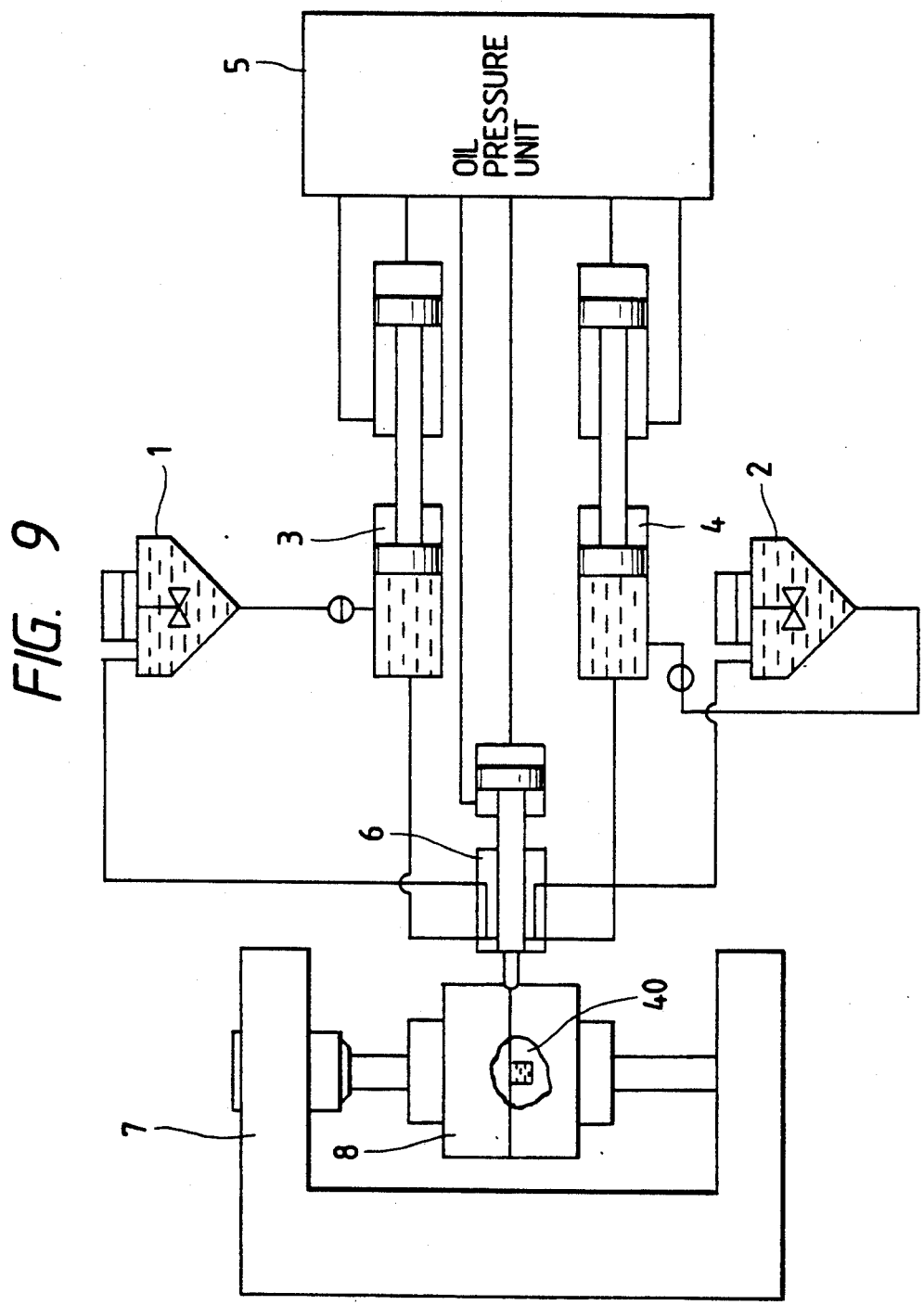
FIG. 9 through FIG. 17 are drawings concerning the second embodiment, FIG. 9 showing the whole constitutional view of the device, FIG. 10 a longitudinal sectional view of the mold, FIG. 11, FIG. 13, FIG. 14 and FIG. 15 diagrams for illustrations of the magnetic circuits, FIG. 12 a diagram showing the Winding state of the electromagnetic coil, FIG. 16 a diagram for illustration of localization of the magnetic material of the molded magnet, FIG. 17 a diagram showing the effect of the magnet prepared by the device shown in FIG. 9.

FIG. 9 shows a constitutional view of device, in which the portions except for the mold pertinent portion shown by the symbol 40 are the same as in FIG. 1, and explanations thereof are omitted.

Figure 10:
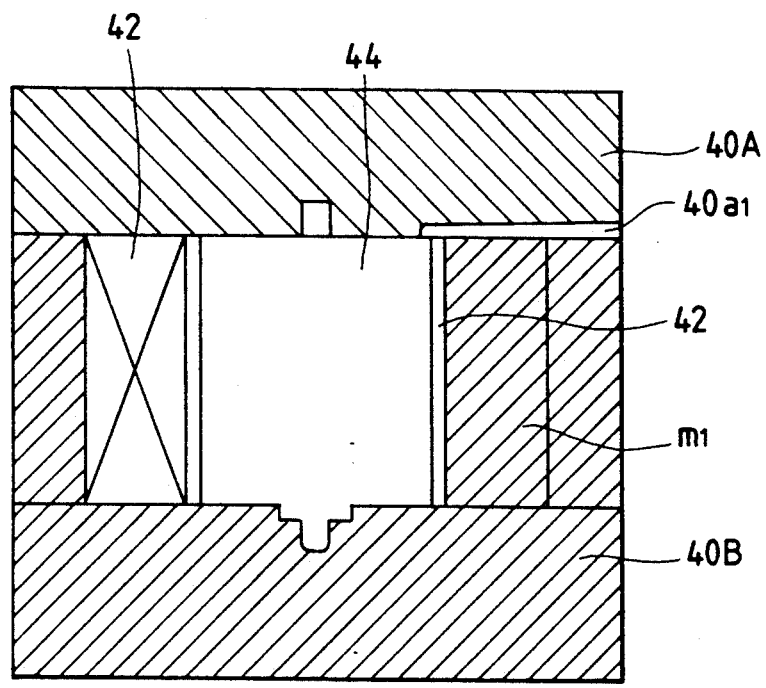
Figure 11:
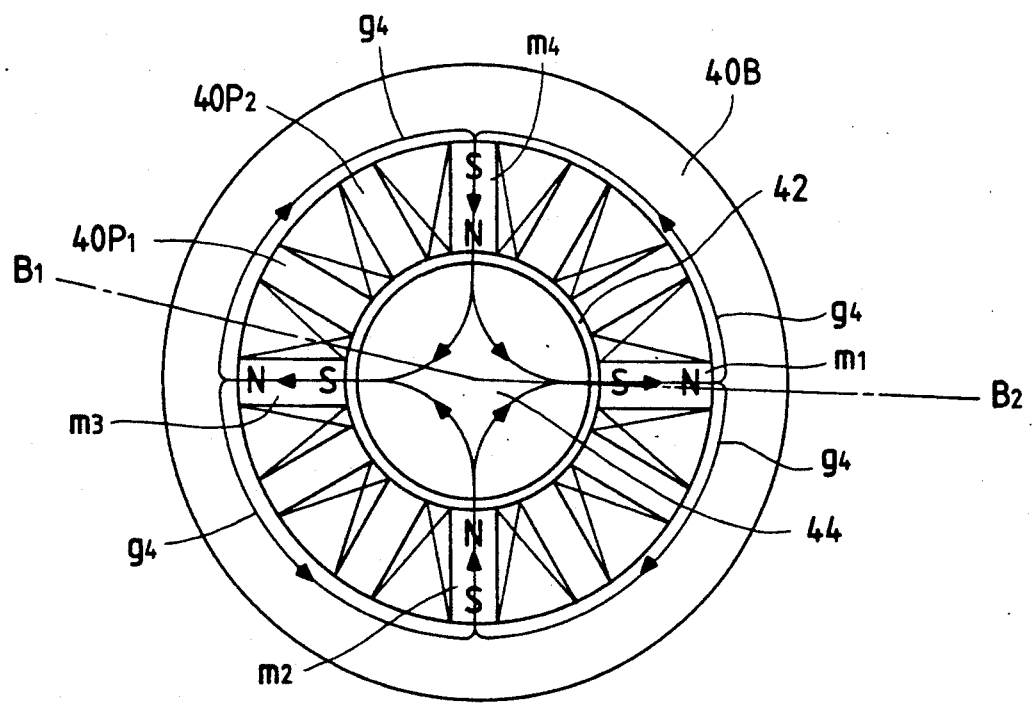

FIG. 10 and FIG. 11 are illustrations of the details of the mold pertinent portion 40. In the FIGS. 40A shows the upper mold and 40B the lower mold. The upper end of the lower mold 40B has the sleeve 42 made of a magnetic material fitted at the central portion, and teeth portions 40P$_1$, 40P$_2$ . . . which become the magnetic poles protruded in shape of a comb from the inner peripheral portion of the lower mold formed at the outside of said sleeve.

m$_1$–m$_4$ are permanent magnets formed by withdrawing a part of the teeth portion of the above-mentioned lower mold 40 (4 upper and lower radial symmetrical positions) and fixing them embedded in those places.

44 is a coil wound around the pole teeth 40P$_1$, 40P$_2$, . . . of the lower mold 40, and by current passage through said coil 44, the pole teeth 40P$_1$, 40P$_2$, . . . are made electromagnets.

Figure 12:
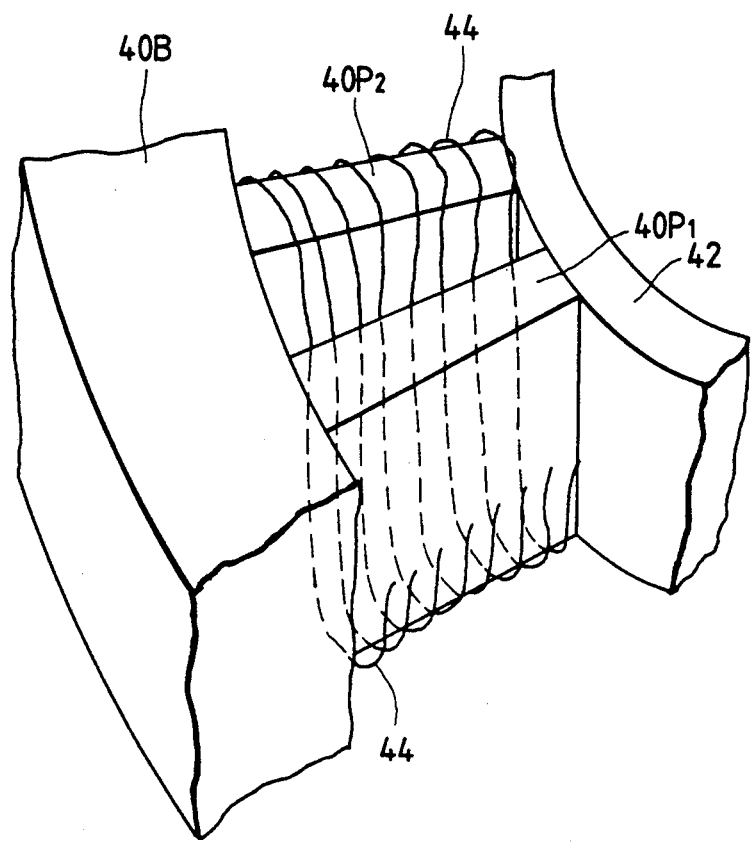

FIG. 12 is a partial schematic view showing the winding state of the coil 44 around the pole teeth 40P$_1$, 40P$_2$, . . .

Next, the operations of the device as described above are explained.

The operations of metering, mixing of the molding material in FIG. 9 are the same as in FIG. 1 as described above.

Before the molding material is injected from the injection cylinder into 44, the mold has a first magnetic circuit formed with permanent magnets m$_1$–m$_4$ as shown in FIG. 11.

The first magnetic circuit constitutes a closed loop comprising permanent magnet m$_3$—lower mold 40B—permanent magnet m$_4$—sleeve 42—molding cavity 44—sleeve 42—permanent magnet m$_3$, and the lines of magnetic force g$_4$ passes therethrough. In FIG. 11, the first magnetic circuits are formed in number of 4. Under this state, the molding material containing the magnetic material is injected from the injection cylinder through the gate 40a$_1$ into the cavity 44.

Figure 13:
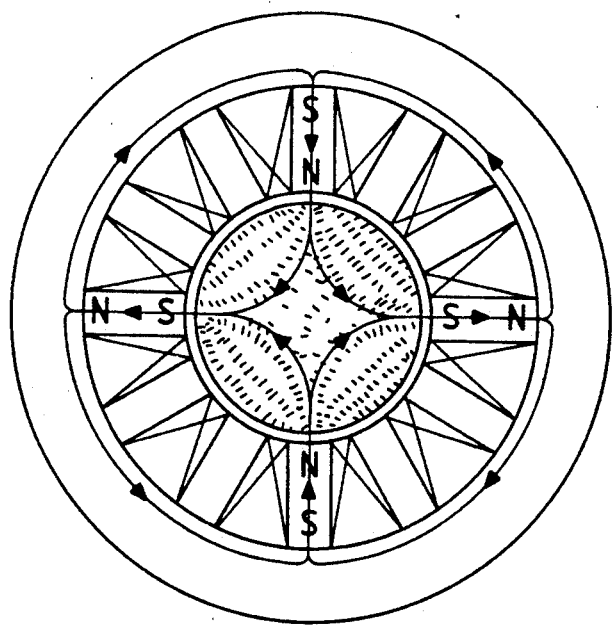

The magnetic material in the molding material injected into the cavity 44 receives localization action by the lines of magnetic force of the first magnetic circuits as shown in FIG. 13.

Figure 14:
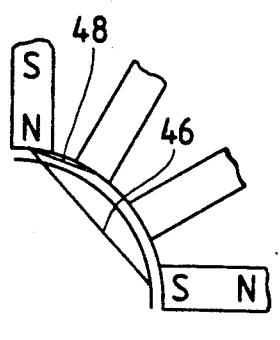

In this mold, the lines of magnetic force generated by the permanent magnets m$_1$–m$_4$ flow through the back yoke b$_1$ constituted of the outer peripheral cylindrical portion 40b$_1$ of the lower mold 40B into the cavity following the permeance defined by the gap between the magnetic poles shown in FIG. 14.

Accordingly, when the reaction curable resin under uncured state containing the magnetic powder is injected into the cavity as described above, the magnetic powder is localized and oriented along the direction of the lines of magnetic powder g$_4$.

In this process, since the lines of magnetic force g$_4$ reach near the central portion of the cavity by taking sufficiently the intervals between the magnets m$_1$–m$_4$, the magnetic powder within the cavity can be localized efficiently in the magnetic force effective region as shown in FIG. 13.

Figure 15:
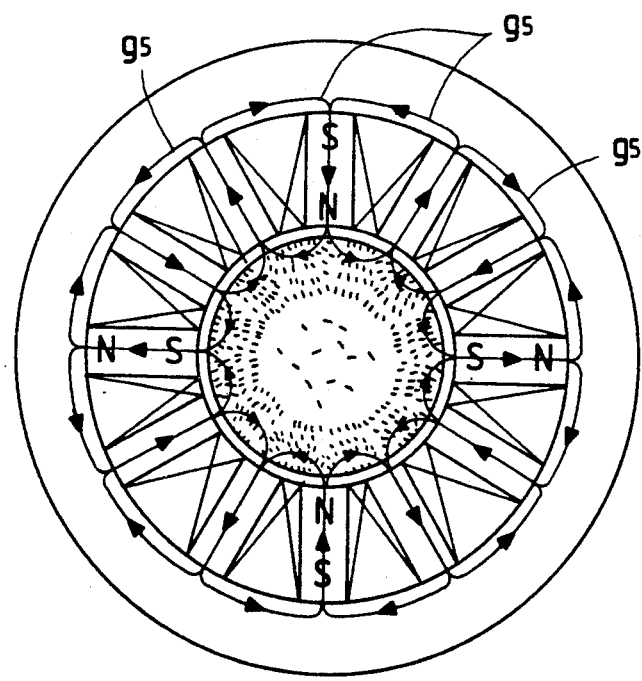

In contrast, when the magnetic field is applied initially from the multiple poles, the flow of lines of magnetic force become as shown by $g_5$ in FIG. 15 following the permeance defined by the gap 48 between the magnetic poles shown in FIG. 14, not reaching the central portion of the cavity, whereby it becomes difficult to have the magnetic powder near the central portion of the cavity effectively localized in the magnetic force effective region.

Therefore, the arrangement of permanent magnets is done with the gap and the intensity at which the applied magnetic field can act effectively to the central portion of the cavity and which can attract the magnetic powder to the region where the magnetic field when the pole number is increased as shown in FIG. 15, and the number of the magnets arranged is determined in relationship with the inner diameter of the molded product and the pole number, etc.

Figure 16:
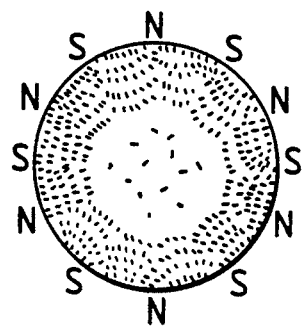

When the localized, oriented states shown in FIG. 13 are obtained, then current is passed through the electromagnetic coil to excite magnetization of the pole teeth $40P_1$, $40P_2$, ... At this time, following the permeance as defined by the gap 48 between the respective magnetic poles shown in FIG. 14, the lines of magnetic force $g_5$ will flow through the respective magnetic poles as shown in FIG. 15 and the back yoke into the cavity, whereby the magnetic powder localized, oriented by the magnetic field from the permanent magnets is oriented corresponding to the magnetic field newly applied. The molded product as shown in FIG. 16 is obtained when subjected to reaction curing and taken out when maintaining the oriented state of the magnetic as shown in FIG. 15. The cured state can be made optimum by the combination of the resin and the curing agent, its mixing ratio and the heating state of the mold, as different from a thermoplastic resin which begins to be solidified by cooling simultaneously with injection into the mold, and therefore a sufficiently localized, oriented state of the magnetic powder can be obtained until solidification of the oriented state.

Application of the magnetic field may be effected until at least the localized, oriented state of the desired powder in the resin within the cavity is stabilized with curing of the resin, and the desired magnetic force is obtained.

The permanent magnets in the mold to be used in the present invention may be preferably arranged with 4-pole arrangement in all the cases of 6 poles or more, with the intervals being preferably equal to each other so far as possible.

The magnetic forces of the respective pole teeth are determined depending on the design of the desired product, and may be either the same or different.

Further, in the example as described above, permanent magnets and electromagnetic coils are assembled, but this combination is not necessarily required. However, for example, electromagnetic coils may also be wound around the magnetic poles similarly as the pole teeth in place of permanent magnets and the manner of flow of current through the electromagnetic coils may be changed from during localization to during orientation of the magnetic powder. Alternatively, electromagnetic coils may be located outside of the mold and magnetic circuits of opening-closing loop may be prepared depending on during localization and during orientation by a ferromagnetic material block, whereby magnetic poles excited and not excited can be prepared and therefore the method of the present invention as described previously can be practiced. When electromagnets are used in place of permanent magnets, they may be used before injection (this corresponds to the case of permanent magnets), during injection or during injection filling. However, when considered in aspect of molding cycle, magnetic excitation is effected by completion of the minimum filling.

EXAMPLE

A reaction curable epoxy resin (curing time 1 min.) containing 67% by weight of samarium cobalt ($SmCo_5$) powder (particle size about 3 μm) was prepared, injected and filled into the cavity of a mold having a constitution as shown in FIG. 10 with a magnetic field applied by the permanent magnets $m_1$–$m_4$ which state was maintained for 3 seconds.

The cavity is constituted so that a columnar molded product with an outer diameter of 6 mm, and a length of 7 mm can be formed, and the magnetic force strength of permanent magnet 3 was 20 KG on the cavity surface.

Next, current was passed through the electromagnetic coil to excite magnetization to the same extent as the permanent magnets, and that state was maintained for one minute.

For obtaining the present molded product, a main agent containing magnetic powder (first liquid) and a curing agent (second liquid) were charged into the feed tanks of the reaction injection molding device and maintained at about 40° C. under circulation. Next, said first and second liquids were mixing injected through the mixing nozzle into a mold of 90° C., maintained for about one minute and then the mold was opened, followed by mold release by an ejection pin. For making the mold release resistance smaller, no magnetic excitation by electromagnetic coil was effected during mold opening.

Figure 5:
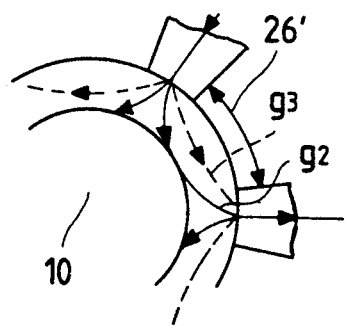

The formation state of the magnetic poles of the peripheral portion at the cross-section perpendicular to the axis of the resinous magnet of the columnar resinous magnet, and the localized, oriented state of magnetic powder were examined by lapping the section of the magnet and observing the section by a metal microscope, and the content of the magnetic powder by extracting and calcining a small strip from the magnet. As the result, as shown in FIG. 5, 12 anisotropic magnetic poles were formed at the peripheral sides, and also it was confirmed that most of the magnetic was localized and oriented in the peripheral side direction. The content of the magnetic powder in the magnetic force effective area was found to be 92% by weight, and that in the vicinity of the central portion 5% by weight.

Further, a resinous magnet obtained according to the magnetism imparting method known in the art was imparted with magnetism, and its surface flux density and weight was measured to be 830 G, and the weight 0.65 g.

COMPARATIVE EXAMPLE 1

Under the state with the magnetic field applied within the cavity 7 from all the magnetic poles (3, 5-1, 5-2), a reaction curable resin containing magnetic powder was injected and filled therein, and that state was maintained for one minute, otherwise following the same procedure as in Example 1 to obtain a columnar multi-polar (12 poles) anisotropic resinous magnet.

The resinous magnet obtained after magnetization had a surface flux density of 550 G and a weight of 0.65 g.

When the formation state of the magnetic poles and the distribution of magnetic powder at the cross-section perpendicular to the axis were examined in the same manner as in Example, an anisotropic magnetic pole of 12 poles was found to be formed around the cross-section, with the magnetic powder content in the magnetic force effective area localized in the peripheral side direction being 75% by weight, and the magnetic powder content near the central portion 16% by weight.

COMPARATIVE EXAMPLE 2

A thermoplastic 6-nylon resin containing 93% by weight of samarium cobalt powder (particle size: about 1 to 3 μm) was injection molded according to the 12 pole anisotropic orientation method known in the art to obtain a columnar multi-polar anisotropic magnet.

The molding conditions were a resin temperature of 280° C., an injection pressure of 1500 Kgf/cm$^2$, a mold temperature of 110° C.

The resinous magnet after imparting of magnetism was found to have a surface flux density of 820 G and a weight of 1.1 g.

When the formation state of the magnetic poles at the cross-section perpendicular to the axis of the resinous magnet obtained was examined, it was confirmed that 12 anisotropic magnetic poles were formed at the peripheral sides thereof. When the distribution state of the magnetic powder at the surface perpendicular to the axis was examined, the magnetic powder content in the magnetic force effective region near the peripheral side was found to be 94% by weight, and the magnetic powder content at the central portion 83% by weight.

As can be understood from the results as described above, the multi-polar anisotropic resinous magnet according to the present invention is greater in surface flux density and also lighter in its own weight, and therefore very useful for high rotation torque rotor, etc.

Figure 18:
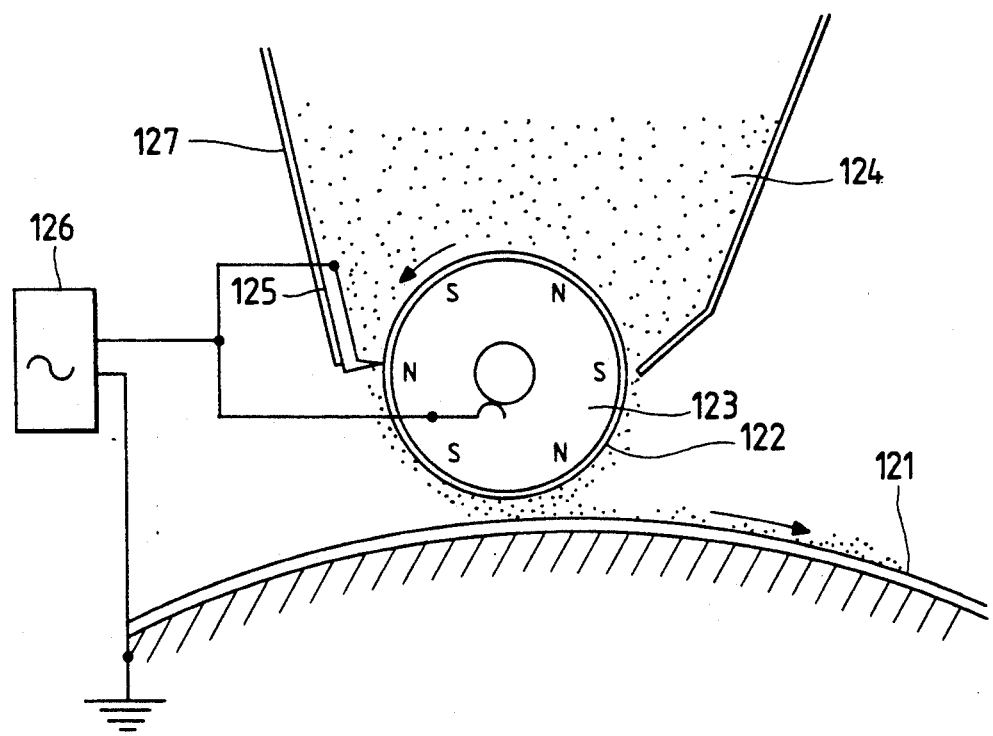
FIG. 18 is a diagram for illustration of application of the permanent magnet prepared by the present invention to an image forming device.

FIG. 18 shows an example of using the magnet prepared according to the preparation process of the present invention for permanent magnet other than motor. FIG. 18 illustrates use of the magnet prepared by the present invention for a developing instrument of an image forming device.

121 is a photosensitive drum having an insulating layer on CdS layer, 122 a sleeve made of aluminum, and the members 121 and 122 rotate in the same direction at substantially the same circumferential speed of 400 mm/sec. The diameters of the photosensitive drum 121 and the sleeve 122 are 200 mm and 50 mm, respectively, and both are maintained at a minimum gap of 300μ, and form a developing section in the vicinity thereof. Both assume their shapes so that the gap therebetween necessarily becomes larger after passing the most proximate position with their rotations.

123 is a permanent magnet to be fixed within the sleeve and is prepared according to the process of the present invention. 124 is a magnetic toner as described below, 125 a blade made of iron for coating said toner uniformly onto the sleeve.

The blade 125 is located at the position opposed to the magnetic pole of the magnet 123 with a gap of 250μ being maintained between its tip and the sleeve 122. The magnetic field at the tip of the blade 125 is about 750 G. The magnetic toner 124 is regulated to a thickness of about 120μ by the blade 125, and is conveyed to the developing section while imparted with negative charge through friction with the surface of the sleeve 122. The developing position is opposed to between the poles of the magnet within the sleeve. 127 is a toner vessel.

According to the present invention, since magnetic powder can be localized effectively in the magnetic force effective region, magnetic powder can be utilized efficiently for magnetic force. As the result, a magnetic force effective region containing magnetic powder at a high concentration even with a small amount of magnetic powder can be obtained, whereby sufficient magnetic strength can be obtained, and also it becomes possible to a great extent to effect lower cost and lightweight.

In the present invention, the resinous magnet is obtained by low pressure molding, and therefore no constitution required for high pressure molding is unnecessary for molding machine, thus enabling utilization of inexpensive molding machine, and reduction of production can be also effected from this point.

Figure 17:
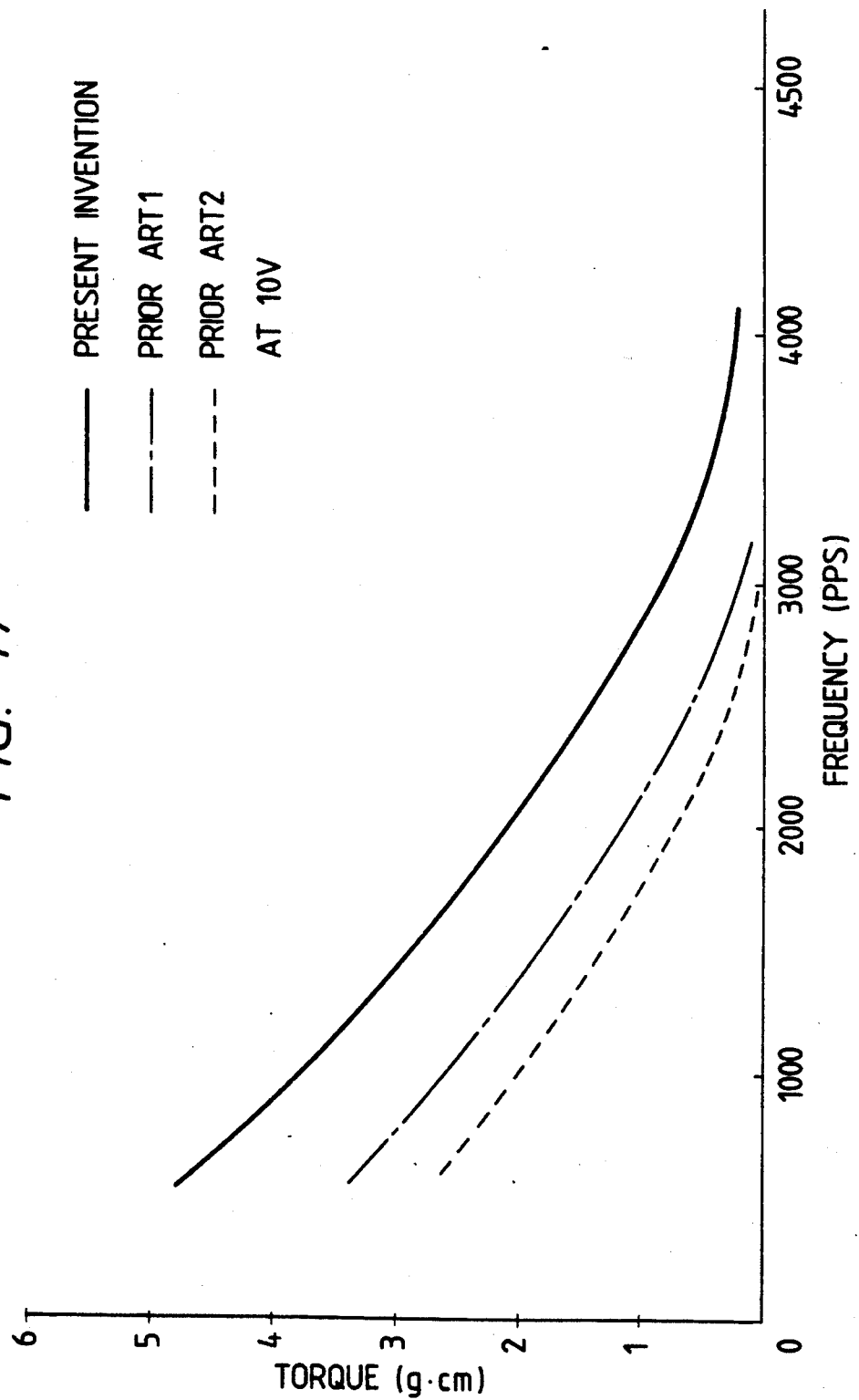

FIG. 17 shows the comparison results of the magnet M$_2$ made of a resin prepared according to the preparation process as described above practiced by means of the exemplary device shown in FIG. 9 to FIG. 16 with the magnet shown in the above Comparative example.

What is claimed is

1. A process for preparing a multi-polar anisotropic resinous magnet by injecting a liquid reaction curable resin containing magnetic powder into a mold for molding and applying a magnetic field for multiple-pole orientation thereon, comprising:
    (a) injecting said reaction curable resin into a mold for molding provided between a large number of magnetic poles arranged at predetermined intervals including magnetic poles with freely convertible magnetism and back yokes opposed to these magnetic poles;
    (b) permitting a magnetic flux to flow in one direction to the back yokes with the respective magnetic poles being made the same polarity, while maintaining the resin under uncured state injected in said magnetic flux, to localize and orient the magnetic powder in said resin corresponding to said magnetic flux: and
    (c) after completion of the step (b), completing the reaction curing of the resin while applying a magnetic field obtained by converting the magnetism of said magnetic poles to the desired multi-polar anisotropy of the resinous magnet, thereby to magnetize the magnetic powder within the resin corresponding to said magnetic field.

2. A process for preparing a magnet made of a resin comprising:
    mixing a first material comprising magnetic material and a second material comprising a reaction curable agent;
    preparing a mold for molding of a hollow cylindrical magnet, said mold having a cavity into which said materials are injected, said mold comprising a part of the cavity and comprising:
    a magnetic circuit forming member for forming a first magnetic circuit which passes through the cavity;
    a first coil for energizing said magnetic circuit forming member and
    a second coil positioned in a position around said cavity and forming a second magnetic circuit for forming a magnetic pole of the molded magnet;
    injecting said mixed materials into said cavity;
    causing the magnetic material in the material injected into said cavity to form a partial aggregating state in said cavity by a magnetic force generated by said first magnetic circuit;

thereafter magnetizing and orienting by said second magnetic circuit the magnetic material in the partial aggregating state formed by said first magnetic circuit to form the magnetic pole of the magnet molded, wherein a portion in the aggregating state formed by said step is magnetized; and removing the molded magnet from the cavity.

3. A preparation process according to claim 2, wherein the material injected into said cavity contains a nylon type main agent, an epoxy type reaction curing agent and a magnetic material, and the ratio of said magnetic material to the whole material injected is from 50–70% by weight.

4. A preparation process according to claim 3, wherein said hollow cylindrical cavity forms a magnet for motor.

5. Use of the molded magnet prepared according to the preparation process of claim 1 for an image forming device.

6. A process for preparing a multi-polar anisotropic resinous magnet by injecting a liquid reaction curable resin containing magnetic powder into a mold for molding and applying a magnetic field from magnetic poles for multi-polar orientation comprising:

(a) injecting said reaction curable resin into a mold for molding provided between a large number of magnetic poles with freely convertible magnetism and back yokes opposed to these magnetic poles;

(b) applying a magnetic field from the magnetic poles with a pole number smaller than a desired pole number on uncured resin injected into the mold for molding, thereby localizing and orienting the magnetic powder in said resin to a magnetic force effective region corresponding to said magnetic field; and (c) further completing reaction curing of the resin under a state where the magnetic field is applied from the desired pole number on the localized and oriented magnetic powder in the step (b) thereby obtaining a magnet comprising a multi-polar polar anisotropic cured resin with the magnetic powder localized and oriented in the magnetic force effective region corresponding to said magnetic field.

7. A process for preparing a magnet made of a resin comprising:

mixing a main agent material, a reaction curing agent and a magnetic material;

preparing a mold for molding of said magnet, wherein said mold has the following members, namely:

a first cylindrical member having a cavity for molding of the cylindrical magnet;

a second cylindrical member arranged concentrically with said first cylindrical member;

a plurality of magnet members for formation of a first magnetic circuit arranged radially between said first and second cylindrical members;

a yoke member for formation of the magnetic pathway arranged and between said first and second cylindrical members; and a coil member wound around said yoke member for formation of a second magnetic circuit;

localizing the magnetic material by a magnetic force of the first magnetic circuit so that said magnetic material is aggregatively distributed at a peripheral portion of the cavity of the cylindrical member rather than a central portion;

thereafter magnetizing said aggregatively distributed portion by the second magnetic circuit; and curing the injected marital within said cavity while maintaining the localized and magnetized state of the magnetic material.

8. A process according to claim 7, wherein said mold has further the following members:

a number n of said magnet members constituting said first magnetic circuit has the relationship relative to the number N of magnetic poles of the magnetic member of $N = X \cdot n$ (where X is an integer).

9. Use of the molded pole prepared according to the preparation process of claim 7 for an image forming device.

* * * * *

UNITED STATES PATENT AND TRADEMARK OFFICE
CERTIFICATE OF CORRECTION

PATENT NO. : 5,145,614
DATED : September 8, 1992
INVENTOR(S) : MASAAKI KURODA

It is certified that error appears in the above-indentified patent and that said Letters Patent is hereby corrected as shown below:

TITLE PAGE

IN [57] ABSTRACT

Line 2, "preparing a multi-polar anisotropic" should be deleted.
  Line 3, "resinous magnet by" should be deleted.

COLUMN 1

Line 21, "made" should be deleted.
  Line 55, "by" should read --by the--.

COLUMN 2

Line 14, "high" should read --and high--.
  Line 16, "mold," should read --mold and--.

COLUMN 4

Line 16, "acrylio" should read --acrylic--.

COLUMN 5

Line 3, "Winding" should read --winding--.

COLUMN 7

Line 43, "pole," should read --pole;--.

COLUMN 9

Line 46, "ca" should read --can--.
  Line 61, "outinsert" should read --outsert--.

UNITED STATES PATENT AND TRADEMARK OFFICE
CERTIFICATE OF CORRECTION

PATENT NO. : 5,145,614
DATED : September 8, 1992
INVENTOR(S) : MASAAKI KURODA

It is certified that error appears in the above-identified patent and that said Letters Patent is hereby corrected as shown below:

COLUMN 10

Line 2, "axis of" should be deleted.
Line 21, "mold 40" should read --mold 40B--.
Line 24, "mold 40" should read --mold 40B--.
Line 36, "44," should read --cavity 44,--.
Line 43, "passes" should read --pass--.

COLUMN 12

Line 47, "magnetic" should read --magnetic powder--.

COLUMN 13

Line 18, "Kgf" should read --Kg--.

COLUMN 14

Line 62, "member" should read --member;--.

COLUMN 15

Line 42, "polar" should be deleted.

UNITED STATES PATENT AND TRADEMARK OFFICE
CERTIFICATE OF CORRECTION

PATENT NO. : 5,145,614

DATED : September 8, 1992

INVENTOR(S) : MASAAKI KURODA

Page 3 of 3

It is certified that error appears in the above-identified patent and that said Letters Patent is hereby corrected as shown below:

COLUMN 16

Line 19, "and" should be deleted.
Line 30, "marital" should read --material--.

Signed and Sealed this

Fourth Day of January, 1994

Attest:

BRUCE LEHMAN

Attesting Officer

Commissioner of Patents and Trademarks